United States Patent [19]

Mitulla et al.

[11] Patent Number: 4,603,169
[45] Date of Patent: Jul. 29, 1986

[54] THERMOPLASTIC MOLDING COMPOSITIONS CONTAINING POLYCARBONATE AND A GRAFT COPOLYMER OF RESIN-FORMING MONOMERS ON A RUBBER

[75] Inventors: Konrad Mitulla, Ludwigshafen; Juergen Hambrecht, Heidelberg; Adolf Echte; Johann Swoboda, both of Ludwigshafen; Peter Siebel, Limburgerhof, all of Fed. Rep. of Germany

[73] Assignee: BASF Aktiengesellschaft, Fed. Rep. of Germany

[21] Appl. No.: 722,363

[22] Filed: Apr. 12, 1985

[30] Foreign Application Priority Data

Apr. 14, 1984 [DE] Fed. Rep. of Germany ....... 3414119

[51] Int. Cl.$^4$ ............................................. C08L 69/00
[52] U.S. Cl. ..................... 525/67; 525/148; 525/902
[58] Field of Search ..................... 525/67, 71, 902, 148

[56] References Cited

U.S. PATENT DOCUMENTS 3,130,177  4/1964  Grabowski ..................... 260/45.5
3,988,389  10/1976 Margotte et al. ..................... 525/67
4,461,868  6/1984  Lindner et al. ..................... 525/67

FOREIGN PATENT DOCUMENTS 0111260  1/1983  European Pat. Off. .
3245292  8/1982  Fed. Rep. of Germany .
3149358  2/1984  Fed. Rep. of Germany .
1253226  11/1971 United Kingdom .

Primary Examiner—Theodore E. Pertilla
Attorney, Agent, or Firm—Keil & Weinkauf

[57] ABSTRACT

A thermoplastic molding material consists of a polycarbonate A and a graft copolymer B, the latter consisting of an elastomer (rubber) ($b_1$) and a shell ($b_2$) grafted onto the elastomer.

The elastomer ($b_1$) contains, as copolymerized units, from 35 to 100% by weight of a diene from the group consisting of the conjugated dienes of 4 to 5 carbon atoms, and can contain, as copolymerized units, from 0 to 65% by weight of a monomer from the group consisting of the alkyl acrylates or alkyl methacrylates, where alkyl is of 1 to 8 carbon atoms.

The shell ($b_2$) is obtained in a conventional manner by successive polymerization of the monomers constituting the shell, in two process steps, in the presence of the elastomer ($b_1$); in a first process step, from 10 to 90% by weight of a mixture of a vinylaromatic hydrocarbon and one or more ethylenically unsaturated monomers which differ from the said hydrocarbon, in a weight ratio of from 90:10 to 60:40, are first incorporated as copolymerized units, followed by the polymerization of from 90 to 10% by weight of a monomer from the group consisting of the alkyl acrylates or of the alkyl methacrylates, where alkyl is of 1 to 8 carbon atoms.

The molding material is used for the production of shaped articles.

12 Claims, No Drawings

THERMOPLASTIC MOLDING COMPOSITIONS CONTAINING POLYCARBONATE AND A GRAFT COPOLYMER OF RESIN-FORMING MONOMERS ON A RUBBER

The present invention relates to a thermoplastic molding material which consists of a polycarbonate as a hard matrix, in which a graft copolymer having a particle size of from 200 to 700 nm is dispersed as the soft phase. The graft copolymer consists of an elastomer, which is essentially based on a diene, and a shell which is grafted onto the elastomer in 2 process steps.

The relevant prior art includes:
1. U.S. Pat. No. 3,130,177
2. British Pat. No. 1,253,226
3. German Laid-Open Application DOS No. 3,149,358
4. German Laid-Open Application DOS No. 3,210,284 and
5. German patent application No. P 32 45 292.5.

Blends of tough polymers, containing styrene and acrylonitrile, with polycarbonates are described in (1) and (2). These conventional molding materials generally possess satisfactory properties. The 2-stage grafting of ASA polymers is disclosed in (3), while (5) describes blends of ASA polymers, having a 2-stage grafted shell, with polycarbonates. The material described in (4) and consisting of PC and ASA additionally contains a acrylate copolymer.

Frequently, however, greater toughness and improved, more homogeneous distribution of the soft phase are required, coupled with stronger weld lines in moldings produced from these materials. Thus, the molding materials disclosed in, for example, (4) or (5) possess insufficient toughness at low temperatures, in particular insufficient multiaxial impact strength.

The molding materials disclosed in (1) or (2) and based on PC and ABS have a non-homogeneous distribution of the soft phase, do not possess strong weld lines and in general exhibit a low multiaxial impact strength.

It is an object of the present invention to overcome the disadvantages of the conventional molding materials essentially based on ABS and polycarbonates, in order to meet the requirements set in the automotive sector.

We have found that this object is achieved by a molding material as claimed in claim 1.

The present invention therefore relates to a thermoplastic molding material containing
(A) from 10 to 90 parts by weight of one or more polycarbonates and
(B) from 90 to 10 parts by weight of one or more graft copolymers which have a mean particle size of from 200 to 700 nm ($d_{50}$ value of the integral mass distribution) and consist of:
  $b_1$) one or more elastomers (rubbers), which account for from 10 to 80, preferably from 30 to 70, % by weight, based on B), and
  ($b_2$) a shell which is grafted onto the elastomer and accounts for from 90 to 20, preferably from 70 to 30, % by weight, based on (B),
the elastomer ($b_1$) containing, as copolymerized units,
  ($b_1a_1$) from 35 to 100, preferably from 40 to 100, % by weight of one or more dienes from the group consisting of the conjugated dienes of 4 or 5 carbon atoms, and
  ($b_1a_2$) from 0 to 65, preferably from 10 to 60, % by weight of one or more monomers from the group consisting of the alkyl acrylates or alkyl methacrylates where alkyl is of 1 to 8 carbon atoms, the percentages in each case being biased on ($b_1$), and
the shell ($b_2$) being obtainable in a conventional manner by successive polymerization of the shell-forming graft monomers constituting the shell, in two process steps, in the presence of the elastomer $b_1$), wherein the grafted shell contains, as copolymerized units,
  ($b_2a_1$) from 10 to 90, preferably from 50 to 75, % by weight of a mixture of one or more vinylaromatic hydrocarbons ($b_2a_1\alpha$) and one or more ethylenically unsaturated monomers ($b_2a_1\beta$) which differ from the said hydrocarbons, in a weight ratio ($b_2a_1\alpha$)/($b_2a_1\beta$) of from 90:10 to 60:40, and
  ($b_2a_2$) from 90 to 10, preferably from 50 to 25, % by weight of one or more monomers from the group consisting of the alkyl acrylates or alkyl methacrylates, where alkyl is of 1 to 8 carbon atoms,
the percentages in each case being based on ($b_2$).

The composition of the novel molding material in terms of the components, the composition of the components of the molding material, and its preparation from the components are described below.

The novel molding material contains the components (A) and (B), and preferably consists of these. Component (A) accounts for from 10 to 90, preferably from 30 to 90, % by weight, based on A+B, the remainder to 100% by weight being made up by component B.

Component (B) is composed of 2 parts, or consists of one or more elastomers ($b_1$) and one or more grafted shells ($b_2$), the amounts of the two constituents summing to 100.

The amount of the elastomer ($b_1$) is from 10 to 80, preferably from 30 to 70, in particular from 35 to 60, % by weight, based on B).

The graft copolymer is obtainable by successive polymerization (polymerization in successive steps, in which the monomers of the first stage are incorporated as copolymerized units, fresh monomer being added only after virtually complete conversion) of different monomers or of mixtures of polymers in two process steps, in the presence of the elastomer $b_1$) in emulsion, and the particles of the resulting latex can be brought in a conventional manner, for example by agglomeration, to the desired size within the stated range of from 200 to 700 ($d_{50}$ value of the integral mass distribution) before grafting is carried out. Grafting is effected in a manner such that, in the first stage, from 10 to 90, preferably from 50 to 75, in particular from 55 to 70, % by weight of $b_2$) are grafted on. In the second stage of the process, from 90 to 10, preferably from 50 to 25, in particular from 45 to 30, % by weight are grafted on, i.e. the grafted shell contains, as copolymerized units, the stated amounts of the monomers used in the two stages of the process.

COMPONENT A

In the context of the novel molding material, polycarbonates A are aromatic polycarbonates based on homopolycarbonates and copolycarbonates. Examples of suitable bisphenols are dihydroxydiphenyls, bis-(hydroxyphenyl)-alkanes and bis-(hydroxyphenyl) ethers. However, any other bisphenols which are suitable for the preparation of polycarbonates can also be employed, such as those described in, inter alia, the monograph by H. Schnell entitled Chemistry and Physics of Polycarbonates, Inter-science Publishers, New York, 1964, U.S. Pat. No. 2,999,835 and German Laid-Open Application No. DOS 2,248,817. Par-ticularly preferred polycarbonates are those based on 2,2-bis-(4-hydroxyphenyl)-propane. The synthesis of the polycarbonates is described in, for example, U.S. Pat. No. 2,999,835 and British Pat. No. 772,627.

COMPONENT B

Component B (graft copolymer or soft phase) of the novel molding material is dispersed, in the form of particles of from 200 to 700 nm (mean particle size, $d_{50}$ value of the integral mass distribution), in component A which acts as the hard matrix.

Component B consists of 2 parts, i.e. one or more elastomers (rubbers) ($b_1$) which have a glass transition temperature of less than 0° C., preferably less than −50° C. This elastomer preferably contains homo- or copolymers of conjugated dienes ($b_1a_1$) of 4 or 5 carbon atoms, in particular 1,3-butadiene and isoprene, or consists of these. The elastomer is preferably polybutadiene but can contain, as copolymerized comonomers $b_1a_2$), as much as 65, preferably from 10 to 60, % by weight, based on $b_1$) of one or more further monomers from the group consisting of the alkyl acrylates and alkyl methacrylates, where alkyl is of 1 to 8 carbon atoms. The alkyl acrylates are preferred, and among these N-butyl acrylate and 2-ethylhexyl acrylate, or mixtures of these, are particularly preferred.

The component B to be employed can be prepared by, for example, the method described in German Pat. No. 1,260,135.

Preparation of the elastomer $b_1$

The elastomer, the grafting base $b_1$), is prepared by polymerizing the conjugated dienes $b_1a_1$) alone or, if required, together with the further comonomers $b_1a_2$), in aqueous emulsion, in a conventional manner, at from 20° to 100° C., preferably from 50° to 80° C. The conventional emulsifiers, such as alkali metal salts of alkyl or alkylarylsulfonic acids, alkylsulfates, fatty alcohol sulfonates, salts of higher fatty acids of 10 to 30 carbon atoms or resin soaps, can be used, the sodium salts of alkylsulfonates or fatty acids of 10 to 18 carbon atoms being preferred. It is advantageous to employ the emulsifiers in amounts of from 0.5 to 5, in particular from 1 to 2, % by weight, based on the monomers used for the preparation of the grafting base ($b_1$). In general, the ratio of water to monomers is from 2:1 to 0.7:1. Particularly useful polymerization initiators are the conventional persulfates, such as potassium persulfate, but it is also possible to use redox systems. The initiators are employed in general in amounts of from 01 to 1% by weight, based on the monomers used in the preparation of the grafting base ($b_1$). Other assistants which can be used in the polymerization are the conventional buffer substances, by means of which the pH is brought to, preferably, from 6 to 9, e.g. sodium bicarbonate and sodium pyrophosphate, as well as from 0.1 to 3% by weight of a molecular weight regulator, such as a mercaptan, terpinol or dimeric α-methylstyrene.

The exact polymerization conditions, in particular the type, rate of metering and amount of the emulsifier, are chosen specifically within the above ranges so that the resulting latex of the polymer $b_1$ has a $d_{50}$ value of from about 200 to 700 nm, preferably from 250 to 600 nm. Otherwise, the emulsion polymer with a mean particle size of from 60 to 150 nm is agglomerated in a conventional manner (cf. German Published Application DAS No. 2,427,960).

Preparation of the grafted shell $b_2$)

The grafted shell, component $b_2$, is built up in 2 stages, and is produced by successive polymerization of the monomers ($b_2a_1$) and ($b_2a_2$) in 2 process steps in the presence of the latex of the elastomer $b_1$). For its preparation, one or more vinylaromatic hydrocarbons of not more than 12 carbon atoms ($b_2a_1\alpha$) mixed with one or more ethylenically unsaturated monomers ($b_2a_1\beta$) which differ from the said hydrocarbons are first used. The ratio of the copolymerized monomers ($b_2a_1\alpha$)/($b_2a_1\beta$) in the copolymer (side-graft) produced in the first process stage should be from 90:10 to 10:90, preferably from 60:40 to 20:80.

The method for achieving this object is known to the skilled worker (initial introduction of the monomers, addition during the polymerization, etc.).

Examples of monomers ($b_2a_1\alpha$) are styrene, α-methylstyrene and styrenes which are alkylated in the nucleus, such as p-methylstyrene and tert.-butylstyrene. Styrene, α-methylstyrene and p-methylstyrene are particularly preferably used.

Examples of copolymerizable, ethylenically unsaturated monomers ($b_2a_1\beta$) which differ from these are acrylonitrile, acrylic acid, maleic anhydride, acrylamide and/or vinyl methyl ether, acrylonitrile being particularly preferred. Monomer mixtures which are particularly preferred for carrying out the first stage of the grafting are, in particular, styrene and acrylonitrile, α-methylstyrene or p-methylstyrene and acrylonitrile, and styrene, α-methylstyrene and acrylonitrile.

It is advantageous if the graft copolymerization of the mixture of the monomers ($b_2a_1\alpha$) and ($b_2a_1\beta$) onto the elastomer ($b_1$) serving as the grating base is carried out in aqueous emulsion under the conventional conditions stated above. The graft copolymerization can advantageously be effected in the same system as the emulsion polymerization for the preparation of the grafting base ($b_1$), and, if necessary, further emulsifier and initiator can be added. The monomer mixture to be grafted on can be added to the reaction mixture of the particular process stage all at once, batchwise in several stages or, preferably, continuously during the polymerization. The graft copolymerization in the presence of the elastomer is carried out so that the resulting graft copolymer has a degree of grafting of from 2.5 to 50, preferably from 10 to 40, based on the first stage of the process.

The degree of grafting (PG) is the ratio of the graft monomers to the graft rubber, in parts by weight, multiplied by 100

$$PG = \frac{\text{Graft monomers}}{\text{Graft rubber}} \cdot 100$$

the relevant expression for the first grafting stage being:

$$\frac{b_2a_1}{b_1 + b_2a_1}$$

and that for the second grafting stage being:

$$\frac{b_2a_2}{b_1 + b_2a_1 + b_2a_2}$$

Then, in the second process step, one or more monomers ($b_2a_2$) from the group consisting of the alkyl methacrylates or of the alkyl acrylates, where alkyl is of 1 to 8 carbon atoms, are grafted on and hence incorporated as copolymerized units. The alkyl methacrylates alone are preferred, and among these methyl methacrylate, in particular, is incorporated as copolymerized units.

The second step of the graft copolymerization, too, is advantageously carried out in the same system. If necessary, further emulsifier and initiator can be added. The monomer to be grafted on, preferably methyl methacrylate, can be added to the reaction mixture all at once, bathwise in several steps or, preferably, continuously during the polymerization. The graft copolymerization in the presence of the already grafted latex of the elastomer ($b_1$) is carried out so that the resulting degree of grafting is from 5 to 50, preferably from 10 to 40. The graft copolymer (B) should have a mean particle size of from 50 to 700 nm ($d_{50}$ value), in particular from 200 to 500. The conditions for the graft copolymerization should be chosen so that particle sizes in this range result. Measures to this end are known, and are described in, for example, German Patent No. 1,260,135, German Laid-Open Application DAS No. 2,826,925 and J. Appl. Polym. Sci. 9 (1965), 2929–2938.

In addition to the graft copolymer ($b_1+b_2$), component (B) also contains a small amount of a non-elastomeric hard component which is formed during the graft copolymerization and consists of free, non-grafted copolymers or homopolymers of the graft monomers.

If desired, and particularly if required by the property spectrum, it is also possible to add a copolymer to the novel molding material consisting of the components A and B. This can be, in particular, a (co)polymer which is composed of, in particular, the monomers of the grafted shell ($b_2$) and acts as a hard matrix for the component (B).

This additional, separately prepared hard component can be, for example, a styrene/acrylonitrile copolymer, an α-methylstyrene/acrylonitrile copolymer, a methyl methacrylate polymer, a styrene/maleic anhydride copolymer or an α-methylstyrene/styrene/acrylonitrile, styrene/acrylonitrile/maleic anhydride or α-methylstyrene/styrene/acrylonitrile /terpolymer. These copolymers can be employed individually or as a mixture with one another, to replace some of the hard component (A).

The additional, separately prepared hard component can be obtained by a conventional method. For example, the copolymeriztion of the styrene and/or—methylstyrene with acrylonitrile can be carried out as a mass polymerization or in solution, suspension or aqueous emulsion. The hard component preferably has an intrinsic viscosity of from 40 to 100, in particular from 50 to 80. The intrinsic viscosity is determined as described in DIN No. 53,726, 0.5 g of material being dissolved in 100 ml of dimethylformamide.

COMPONENT C

The molding material according to the invention can furthermore contain additives as are conventionally employed for ABS polyers and polycarbonates. Examples of such additives are fillers, dyes, pigments, antistatic agents, or antioxidants, flame-proofing agents and lubricants. Particular examples of lubricants are the Pluriols ® based on ethylene oxide and propylene oxide, these lubricants preferably being used in order to maintain good processing characteristics for the molding materials. The additives are used in the usual amounts, preferably in amounts of from 0.1 to a total of about 30% by weight, based on the molding material consisting of A and B.

PREPARATION OF THE MOLDING MATERIAL

Mixing of the components (A), (B) and (C) can be carried out by any conventional method, but is preferably effected by extruding or kneading the components together or mixing them in a roll mill, if necessary the components being isolated beforehand from the solution obtained in the polymerization, or from the aqueous dispersion. The graft copolymerization products obtained in aqueous dispersion [component (B)] can also be partially dewatered or can be mixed directly as a dispersion with the polycarbonate (A) and the component (C), complete drying of the graft copolymer being carried out during the mixing procedure in this case.

The molding materials according to the invention are prepared, for example, by thoroughly mixing a melt of the hard polymers, component (A), with the graft copolymer B at above 200° C. In order to obtain a particularly homogeneous distribution of the soft phase in the hard matrix, the molding materials are preferably prepared by introducing the precipitated copolymer (B), which has a residual water content of from 10 to 40% by weight, into the melt of the polycarbonates [component A], at above 180° C., for example in an extruder, and carrying out thorough mixing. The melt can also be thoroughly mixed directly with a dispersion of the graft copolymer (B), which has a solids content of from 40 to 70% by weight, at above 180° C.

The novel molding material can be processed by a conventional thermoplastic method, for example by extrusion, injection molding, calendering, blow molding, pressing or sintering; particularly preferably, the molding materials prepared by the novel process are injection molded to give moldings for automotive construction.

The parameters described in the present application were determined as follows:

1. The mean particle size and the particle size distribution were determined from the integral mass distribution. The mean particle size in each case is the weight average of the particle sizes as determined by means of an analytical ultracentrifuge by the method due to W. Scholtan and H. Lange, Kolloid-Z, and Z. Polymere 250 (1972), 82–796. The ultracentrifuge measurement gives the integral mass distribution of the particle diameters of a sample. From this, it is possible to determine the percentages by weight of the particles which have a diameter smaller than or equal to a particular size. The mean particle diameter, which is also referred to as the $d_{50}$ value of the integral mass distribution, is defined as that particle diameter for which 50% by weight of the particles have a smaller diameter than the diameter corresponding to the $d_{50}$ value. Similarly, 50% by weight of the particles then have a diameter larger than the $d_{50}$ value. To characterize the width of the particle size distribution of the rubber particles, the $d_{10}$ and $d_{90}$ values obtained from the integral mass distribution are also employed, in addition to the $d_{50}$ value (mean particle diameter). The $d_{10}$ and $d_{90}$ values of the integral mass distribution are defined similarly to the $d_{50}$ value, except that they are based on 10 and 90% by weight, respectively, of the particles. The quotient $$\frac{d_{90} - d_{10}}{d_{50}} = Q$$

is a measure of the width of the particle size distribution.

2. The notched impact strength in [kJ/m$_2$] for samples of the products was measured at 23° C., according to DIN 53,453, on standard small bars injection molded at 250° C. The impact strengths for samples from the comparative experiments and from the examples are also listed in the Table.

3. In the Plastechon test on the products, measurements were carried out at 23° C., according to DIN 53,453, on circular disks injection molded at 250° C. and having a diameter of 60 mm and a thickness of 2 mm, the results being expressed in [Nm]. The values for the samples from examples and from comparative experiments are given in Table 2.

4. The intrinsic viscosity of the polycarbonate used was measured in a 0.5% strength solution in methylene chloride at 20° C.

5. Testing of the weld line was carried out on a specimen of a bar produced by double-gated injection molding, the confluence of the melts being in the middle of the measurement zone. The weld line strength, in kJ/m$^2$, was determined by measuring the impact strength ($a_n$) of this bar at 23° C.

The Examples which follow illustrate the invention. Parts and percentages are by weight, unless stated otherwise.

For the preparation of novel molding materials and molding materials for comparative experiments, the products described below were used.

I A polycarbonate based on 2,2-bis-(4-hydroxyphenyl)-propane and having an intrinsic viscosity of 0.55 [dl/g] was used as a component A).

II the graft copolymers $B_1$ to $B_7$ were used as component B).

A polybutadiene latex is prepared, at 65° C., by polymerization of 60 parts of butadiene in the presence of a solution of 0.5 part of tert.-dodecylmercaptan, 0.7 part of a potassium $C_{14}$-$C_{18}$-alkylsulfonate as an emulsifier, 0.2 art of potassium peroxydisulfate and 0.2 part of sodium pyrophosphate in 80 parts of water. When the polymerization is complete, the polymerization autoclave is let down. The conversion is 98%.

The resulting polybutadiene latex has a mean particle size of 0.1 μm. This latex is agglomerated by adding 25 parts of an emulsion of a copolymer of 96 parts of ethyl acrylate and 4 parts of acrylamide, having a solids content of 10% by weight, and a polybutadiene latex having a mean particle size of from 0.3 to 0.4 μm is formed.

140 parts of the resulting polybutadiene latex are mixed with the amount, stated under $b_2a_1$ in Table 1, of a 70:300 styrene/acrylonitrile mixture and 50 parts of water, a further 0.08 part of potassium persulfate and 0.05 part of lauroyl peroxide are added, and the stirred mixture is then heated at 65° C. for 3 hours. When the first stage of the graft polymerization is complete, the amount, stated under $b_2a_2$ in Table 1, of methyl methacrylate is added in the course of 2 hours, no other additives being introduced. The temperature during the addition is 65° C.

When the graft polymerization is complete, the product is precipitated from the dispersion by means of calcium chloride solution at 95° C., washed with water and dried in a stream of warm air.

Preparation of the graft copolymers $B_1$ and $B_2$ with single-stage shell (for comparative experiments)

140 parts of the resulting polybutadiene latex are mixed with the amount, stated under $b_2a_1$ in Table 1, of a 70:30 styrene/acrylonitrile mixture and 50 parts of water, a further 0.08 part of potassium persulfate and 0.05 part of lauroyl peroxide are added, and the stirred mixture is then heated at 65° C. for 3 hours. Thereafter, the product is precipitated from the dispersion by means of calcium chloride solution at 95° C., washed with water and dried in a stream of warm air.

EXAMPLES AND COMPARATIVE EXPERIMENTS

EXAMPLES 1 to 6 AND COMPARATIVE EXPERIMENTS 1 and 2

The amounts by weight of components A and B stated in Table 2 were mixed in dry form, and the mixture was melted in an extruder at 260° C., kneaded and then granulated. The granules were converted to samples of molding materials, on which the properties listed in the Tables were determined.

TABLE 1

| COMPOSITION OF THE GRAFT COPOLYMERS $B_1$ TO $B_7$ | | | |
|---|---|---|---|
| | $b_1$ parts | $b_2a_1$ parts | $b_2a_2$ parts |
| $B_1$ | 60 | 40 | — |
| $B_2$ | 60 | 60 | — |
| $B_3$ | 60 | 35 | 5 |
| $B_4$ | 60 | 30 | 10 |
| $B_5$ | 60 | 20 | 20 |
| $B_6$ | 60 | 24 | 36 |
| $B_7$ | 60 | 36 | 24 |

TABLE 2

| | Component A parts | Component B parts | Notched impact strength | Plastechon test | Weld line strength |
|---|---|---|---|---|---|
| Comparison 1 | 60 | 40 B 1 | 20 | 34 | 10 |
| Comparison 2 | 60 | 40 B 2 | 24 | 40 | 12 |
| Example 1 | 60 | 40 B 3 | 26 | 46 | 20 |
| Example 2 | 60 | 40 B 4 | 24 | 43 | 22 |
| Example 3 | 60 | 40 B 5 | 26 | 41 | 24 |
| Example 4 | 60 | 40 B 6 | 24 | 55 | 28 |
| Example 5 | 60 | 40 B 7 | 31 | 50 | 24 |
| Example 6 | 50 | 50 B 7 | 24 | 35 | 22 |

We claim:
1. A molding composition of a hard matrix (A) and a soft phase (B) dispersed in the hard matrix, said soft phase being a graft copolymer, which composition comprises:
(A) from 10 to 90 parts by weight of one or more aromatic polycarbonates and
(B) from 90 to 10 parts by weight of one or more graft copolymers which have a mean particle size of from 200 to 700 nm ($d_{50}$ value of the integral mass distribution) and consists of:
(b$_1$) one or more elastomers (rubbers), which account for from 10 to 80% by weight, based on B), and
(b$_2$) a shell which is grafted onto the elastomer and accounts for from 90 to 20% by weight, based on (B), the elastomer (b$_1$) containing, as copolymerized units,

($b_1a_1$) from 35 to 100, % by weight of one or more dienes from the group consisting of the conjugated dienes of 4 or 5 carbon atoms, and ($b_1a_2$) from 0 to 65, % by weight of one or more monomers from the group consisting of the alkyl acrylates or alkyl methacrylates where alkyl is of 1 to 8 carbon atoms, the percentages in each case being based on ($b_1$), and the shell ($b_2$) being formed by successive polymerization of the graft monomers which constitute the shell, in two process steps, in the presence of the elastomer ($b_1$), wherein the grafted shell contains, as copolymerized units ($b_2a_1$) from 10 to 90% by weight of a mixture of one or more vinylaromatic hydrocarbons ($b_2a_1\alpha$) and one or more ethylenically unsaturated monomers ($b_2a_1\beta$) which differ from the said hydrocarbons, in a weight ratio ($b_2a_1\alpha$)/($b_21\beta$) of from 90:10 to 60:40, and ($b_2a_2$) from 90 to 10% by weight of one or more monomers from the group consisting of the alkyl acrylates or alkyl methacrylates, where alkyl is of 1 to 8 carbon atoms, the percentages in each case being based on $b_2$.

2. A molding composition of a hard matrix (A) and a soft phase (B) dispersed in the hard matrix, said soft phase being a graft copolymer, which composition comprises:

(A) from 30 to 70 parts by weight of one or more aromatic polycarbonates and (B) from 70 to 30 parts by weight of one or more graft copolymers which have a mean particle size of from 200 to 700 nm ($d_{50}$ value of the integral mass distribution) and consists of:

($b_1$) one or more elastomers, which account for from 30 to 70% by weight, based on (B), and ($b_2$) a shell which is grafted onto the elastomer and accounts for from 70 to 30% by weight, based on (B), the elastomer ($b_1$) containing, as copolymerized units, ($b_1a_1$) from 35 to 100, % by weight of one or more dienes from the group consisting of the conjugated dienes of 4 or 5 carbon atoms, and ($b_1a_2$) from 0 to 65% by weight of one or more monomers from the group consisting of the alkyl acrylates or alkyl methacrylates where alkyl is of 1 to 8 carbon atoms, the percentages in each case being based on ($b_1$), and the shell ($b_2$) being formed by successive polymerization of the graft monomers which constitute the shell, in two process steps, in the presence of the elastomer ($b_1$), wherein the grafted shell contains, as copolymerized units ($b_2a_1$) from 50 to 75% by weight of a mixture of one or more vinylaromatic hydrocarbons ($b_2a_1\alpha$) and one or more ethylenically unsaturated monomers ($b_2a_1\beta$) which differ from the said hydrocarbons, in a weight ratio ($b_2a_1\alpha$)/($b_2a_1\beta$) of from 90:10 to 60:40, and ($b_2a_2$) from 50 to 25% by weight of one or more monomers from the group consisting of the alkyl acrylates or alkyl methacrylates, where alkyl is of 1 to 8 carbon atoms, the percentage in each case being based on $b_2$.

3. A molding composition of a hard matrix (A) and a soft phase (B) dispersed in the hard matrix, said soft phase being a graft copolymer, which composition comprises:

(A) from 10 to 90 parts by weight of one or more aromatic polycarbonates and (B) from 90 to 10 parts by weight of one or more graft copolymers which have a mean particle size of from 200 to 700 nm ($d_{50}$ value of the integral mass distribution and consist of:

($b_1$) one or more elastomers (rubbers), which account for from 10 to 80% by weight, based on B, and ($b_2$) a shell which is grafted onto the elastomer and accounts for from 90 to 20% by weight, based on B, and the elastomer ($b_1$) containing, as copolymerized units, ($b_1a_1$) one or more dienes from the group consisting of the conjugated dienes of 4 or 5 carbon atoms, and the shell ($b_2$) being formed by successive polymerization of the graft monomers which constitute the shell, in two process steps, in the presence of the elastomer ($b_1$), wherein the grafted shell contains, as copolymerized units, ($b_2a_1$) from 10 to 90% by weight of a mixture of one or more vinylaromatic hydrocarbons ($b_2a_1\alpha$) and one or more ethylenically unsaturated monomers ($b_2a_1\beta$) which differ from the said hydrocarbons, in a weight ratio ($b_2a_1\alpha$)/($b_2a_1\beta$) of from 90:10 to 60:40, and ($b_2a_2$) from 90 to 10% by weight of one or more monomers from the group consisting of the alkyl acrylates or of the alkyl methacrylates, where alkyl is of 1 to 8 carbon atoms, the percentages in each case being based on $b_2$.

4. A molding compositon of a hard matrix (A) and a soft phase (B) dispersed in the hard matrix, said soft phase being a graft copolymer, which composition comprises:

(A) from 30 to 70 parts by weight of one or more aromatic polycarbonates and (B) from 70 to 30 parts by weight of one or more graft copolymers which have a mean particle size of from 200 to 700 nm ($d_{50}$ value of the integral mass distribution and consist of:

($b_1$) one or more elastomers (rubbers), which account for from 30 to 70% by weight, based on B, and ($b_2$) a shell which is grafted onto the elastomer and accounts for from 70 to 30% by weight, based on B, and the elastomer ($b_1$) containing only butadiene as copolymerized monomer ($b_1a_1$), and the shell ($b_2$) being formed by successive polymerization of the graft monomers constituting the shell, in two process steps, in the presence of the elastomer $b_1$), wherein the grafted shell contains, as copolymerized units, ($b_2a_1$) from 10 to 90% by weight of a mixture of one or more vinylaromatic hydrocarbons ($b_2a_1\alpha$) and one or more ethylenically unsaturated monomers ($b_2a_1\beta$) which differ from the said hydrocarbons, in a weight ratio ($b_2a_1\alpha$)/($b_2a_1\beta$) of from 90:10 to 60:40, and ($b_2a_2$) from 90 to 10% by weight of one or more monomers from the group consisting of the alkyl acrylates or of the alkyl methacrylates, where alkyl is of 1 to 8 carbon atoms, the percentages in each case being based on $b_2$.

5. A composition as set forth in claim 1, wherein the polycarbonates are based on bisphenols.

6. The composition of claim 2, wherein the polycarbonates are based on bisphenols.

7. The composition of claim 3, wherein the polycarbonates are based on bisphenols.

8. The composition of claim 4, wherein the polycarbonates are based on bisphenols.

9. The composition of claim 1, wherein the polycarbonates are based on 2,2-bis-(4-hydroxyphenyl)-propane.

10. The composition of claim 2, wherein the polycarbonates are based on 2,2-bis-(4-hydroxphenyl)-propane.

11. The composition of claim 3, wherein the polycarbonates are based on 2,2-bis-(4-hydroxyphenyl)-propane.

12. The composition of claim 4, wherein the polycarbonates are based on 2,2-bis-(4-hydroxyphenyl)-propane.

* * * * *

UNITED STATES PATENT AND TRADEMARK OFFICE
CERTIFICATE OF CORRECTION

PATENT NO. : 4,603,169

DATED : July 29, 1986

INVENTOR(S) : Konrad Mitulla et al.

It is certified that error appears in the above-identified patent and that said Letters Patent is hereby corrected as shown below:

Please add the following to the list of Inventors:

after Peter Siebel, Limburgerhof Add:

Josef Schwaab, Maikammer; Herbert Frank, Weisenheim

Signed and Sealed this

Twenty-fifth Day of November, 1986

*Attest:*

DONALD J. QUIGG

*Attesting Officer*　　　　*Commissioner of Patents and Trademarks*